United States Patent Office 3,496,851
Patented Feb. 24, 1970

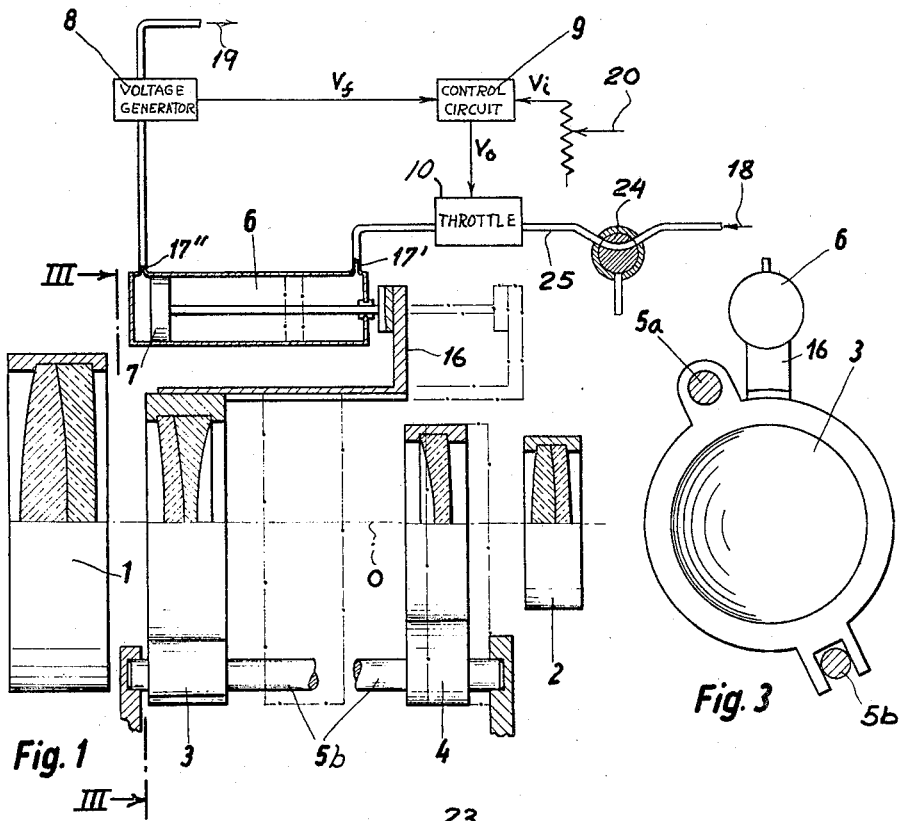
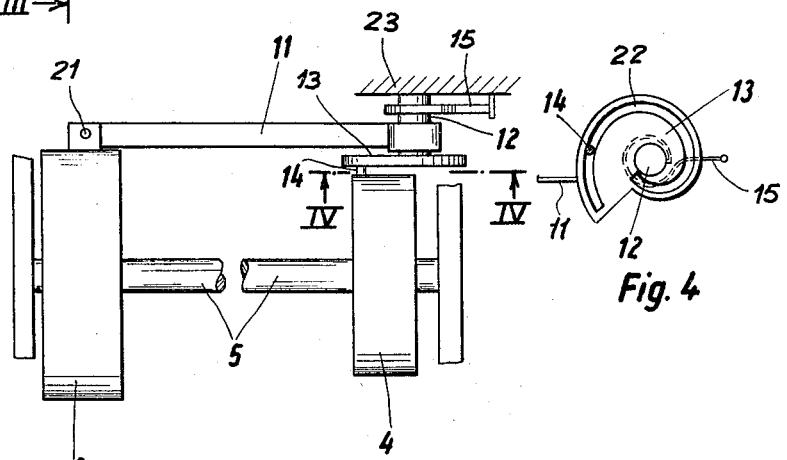

3,496,851
CONTROL MECHANISM FOR COMPONENTS OF OPTICAL OBJECTIVES OR THE LIKE
Paul Himmelsbach, Bad Kreuznach, Germany, assignor to Jos. Schneider & Co., Bad Kreuznach, Germany, a corporation of Germany
Filed Mar. 6, 1967, Ser. No. 620,973
Claims priority, application Germany, Mar. 12, 1966, Sch 38,652
Int. Cl. G03b 3/02
U.S. Cl. 95—45     4 Claims

ABSTRACT OF THE DISCLOSURE

Control mechanism, especially for the displacement of axially movable components of optical objectives and the like, wherein a cylinder extends parallel to the direction of component motion and accommodates a piston movable therein in response to fluid pressure, the piston being mechanically coupled with the component to be displaced. Admission of working fluid to the cylinder is controlled by a selector via a switching circuit which produces an input signal counteracted by a feedback signal, the latter being emitted by a generator responsive to fluid pressure or velocity having an input communicating with the interior of the cylinder. The system also includes a flexible link for operatively connecting the piston-driven component with a second component to be concurrently displaced at a different rate and/or in the opposite direction.

---

My present invention relates to a mechanism for the controlled displacement of one or more components of an optical system, e.g. a pair of lenses forming part of a varifocal objective.

In my prior U.S. Patent No. 3,165,044, owned by the assignee of the present application, I have disclosed a mechanism of this general type using an electric motor for the displacement of the lenses. In order to translate the rotation of the motor shaft into a linear motion of the controlled components, an assembly of gears and cams must be provided. The chatter of the gears is objectionable in some instances, e.g. during the filming of motion pictures. Furthermore, the provision of a separate cam for each component introduces considerable friction and requires relatively powerful electric motors, e.g. with a rating of up to 50 watts, particularly if rapid shifting (say, the traverse of an entire zoom range in about 0.1 sec.) is required. Moreover, such relatively high-powered motors have a certain starting inertia which prevents an instantaneous response of the mechanism to the operation of a pushbutton or similar actuator.

The general object of my invention is to provide an improved mechanism for the purpose described which avoids the aforestated disadvantages.

A more specific object is the provision in such mechanism of simple, freely moving transmission means for translating the displacement of one component into a concurrent shift of another component in the opposite sense and/or at different speed.

With a view of creating a highly compact arrangement eliminating the need for a gear-type transmission, I provide in accordance with this invention a piston-and-cylinder assembly having one member (usually the piston) movable in axial direction of the associated objective and directly coupled with a displaceable optical component so as to control the movement of that component without the use of any cams. The piston and its cylinder are relatively displaced by a pneumatic or hydraulic working fluid whose admission to the cylinder is controlled by a preferably electric actuator producing a suitable control signal. Pursuant to a further feature of my invention, this control signal is derived from a manually or otherwise selected input signal counteracted by a feedback signal from a voltage generator responsive to either the pressure or the velocity of the fluid displaced in the cylinder by the advancing piston, this feedback signal serving to regulate the rate of displacement by arresting the piston in a desired position (pressure response) or stabilizing its rate of movement at a desired speed (velocity response).

Still another feature of my invention relates to the controlled shifting of a second movable component via a special transmission connecting the latter component with the one which is directly coupled with the fluid-driven piston or cylinder. This novel transmission includes a flexible but inextensible link, preferably a metallic ribbon, which is tied at one end to the directly driven component and is partly wound at its other end around a shaft carrying a rotatable cam for the displacement of the second component. The cam may be spring-loaded so as to tend to maintain the flexible link under tension and to urge both components into a normal position which they occupy in the absence of fluid pressure.

My invention will be described in greater detail with reference to the accompanying drawing in which:

FIG. 1 is a somewhat diagrammatic side-elevational view, partly in section, of an optical system with two movable components controlled by a mechanism according to the invention;

FIG. 2 is a top view of the movable components of FIG. 1, showing a transmission interconnecting same;

FIG. 3 is a view taken on the line III—III of FIG. 1; and

FIG. 4 is a detail view taken on the line IV—IV of FIG. 2.

The optical system shown in FIG. 1 comprises two fixed lens members 1, 2 and two adjustable lens members 3 and 4 movable along the optical axis 0 of the system. The movable components 3 and 4 ride on rods 5a, 5b extending parallel to axis 0, component 3 being rigidly coupled by an arm 16 with a piston 7, slidable in a cylinder 6. The cylinder, disposed parallel to axis 0 and secured to a housing 23 partly shown in FIG. 2, has two ports 17', 17" for the admission and removal of a hydraulic or pneumatic working fluid supplied by a source which is schematically represented by an arrow 18; a sink for the fluid is similarly indicated by an arrow 19. The fluid from source 18 passes through a regulation or throttle valve 10 which can be opened and closed by a control circuit 9; the fluid discharged at port 17" traverses a voltage generator 8 responsive to either the pressure or the velocity of that fluid. A selector 20, shown as a potentiometer, supplies to control circuit 9 an input voltage $v_i$ which is opposed by a feedback voltage $v_f$ from generator 8, the difference of these two voltages being an output voltage $v_o$ which determines the setting of valve 10.

As illustrated in FIGS. 2 and 4, component 3 is anchored at 21 to a flexible but inextensible link 11 in the form of a steel ribbon whose other end is coiled around the shaft 12 of a rotatable cam 13. A cam-follower pin 14 rigid with component 4 plays in a groove 22 of cam 13 shaped in conformity with a predetermined law of relative displacement of the two lens members 3 and 4 designed to vary the focal length of the objective without changing the position of its image surface as is well known per se. A restoring spring 15, wound around shaft 12 and anchored at one end to the objective housing 23, tends to rotate the cam 13 counterclockwise (as viewed in FIG. 4) so as to return the component 4 and with it the component 3, through the action of link 11, to a normal position which has been illustrated in dot-dash lines in FIG. 1 and which these components occupy in the absence of fluid pressure to the right of piston 7.

The adjustable throttle valve 10 is preceded by a three-way valve 24 which in one position connects source 18 with the inlet 25 of valve 10 and in another position vents that inlet to the atmosphere. With valve 24 in its illustrated position, fluid pressure from source 18 forces the piston 7 and the lens member 3 to the left, lens member 4 moving in the same direction but at a reduced rate. With potentiometer 20 set to select a desired operating speed, and with voltage generator 8 designed as an oil motor or the like responsive to the velocity of the fluid passing therethrough, throttle valve 10 will be maintained in a position in which sufficient fluid flows into cylinder 6 to overcome the resistance of restoring spring 15 (FIGS. 2 and 4) and to displace the piston 7 at a rate generating a feedback voltage $v_f$ which almost compensates the selected input voltage $v_i$, the resulting output voltage $v_o$ being of such magnitude as to maintain the desired throttle opening. When, on rotation of valve 24 into its alternate position, spring 15 becomes effective to reverse the motion of piston 7, the resulting fluid flow through generator 8 (now in the opposite direction) again creating a feedback voltage $v_f$ nearly balancing the chosen input voltage $v_i$. Thus, the arrangement just described stabilizes the operating speed of the shifting mechanism 6, 7.

It is, however, also possible to design the voltage generator 8 as a pressure-responsive device (e.g. a bellows), it being then merely necessary to replace the sink 19 by a pressure accumulator so that piston 7 will be arrested in a position in which the feedback voltage $v_f$, proportional to the accumulated pressure, substantially balances the selected input voltage $v_i$ from potentiometer 20. When it is desired to move the piston 7 to a selected position further to the right, potentiometer 20 is suitably reset and valve 24 is moved into its venting position whereupon valve 10 cuts off after spring 15 has displaced the piston to a location in which the reduced accumulator pressure decreases the feedback voltage $v_f$ to the new level of input voltage $v_i$.

Naturally, the invention is not limited to the specific details described and illustrated but may be modified in various respects without departing from the spirit and scope of the appended claims.

I claim:

1. A mechanism for axially displacing a component of an optical system, comprising a cylinder member extending parallel to the axis of the associated optical system; a piston member received in said cylinder member, one of said members being mechanically coupled with the component to be displaced; a source of fluid under pressure connected with said cylinder member for relatively displacing said members; and actuating means for controlling the delivery of fluid from said source to said cylinder means, said actuating means comprising a switching circuit for producing an electric input signal for the control of said source.

2. A mechanism as defined in claim 1, further comprising fluid-responsive generator means for producing a feedback signal, conduit means connecting said cylinder member with said generator means, and circuit means for applying said feedback signal to said source in opposition to said input signal.

3. A mechanism for concurrently axially displacing two components of an optical system, comprising a cylinder member extending parallel to the axis of the associated optical system; a piston member received in said cylinder member, one of said members being mechanically coupled with one component to be displaced; a source of fluid under pressure connected with said cylinder member for relatively displacing said members; actuating means for controlling the delivery of fluid from said source to said cylinder member; and a transmission operatively interconnecting said components, said transmission including a rotatable cam provided with a shaft, restoring means tending to maintain said cam in a predetermined position, an inextensive flexible elongated element partly coiled about said shaft and attached to said one component, and cam-follower means operatively coupling the other component with said cam.

4. In an optical objective having a first and a second component displaceable along a common optical axis, the combination therewith of axially extending guide means for said components; a rotatable cam provided with a shaft; coupling means operatively interconnecting said cam and said first component for rotating said cam in response to axial displacement of said first component; and cam-follower means on said second component in engagement with said cam for axially displacing said second component according to a predetermined law of relative motion; said coupling means comprising an inextensible flexible link partly coiled about said shaft and attached to said first component, and restoring means tending to maintain said cam in a predetermined position.

References Cited

UNITED STATES PATENTS

| 3,106,125 | 10/1963 | Martin et al. | 350—187 |
| 3,296,883 | 1/1967 | Plummer | 350—187 |

FOREIGN PATENTS

| 953,865 | 4/1964 | Great Britain. |

NORTON ANSHER, Primary Examiner

R. L. MOSES, Assistant Examiner

U.S. Cl. X.R.

350—180, 187